(12) United States Patent
Mittelholzer et al.

(10) Patent No.: US 8,972,837 B2
(45) Date of Patent: *Mar. 3, 2015

(54) READ/WRITE OPERATIONS IN SOLID-STATE STORAGE DEVICES

(71) Applicant: International Business Machines Corporation, Armonk, NY (US)

(72) Inventors: Thomas Mittelholzer, Rueschilkon (CH); Nikolaos Papandreou, Rueschlikon (CH); Charalampos Pozidis, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 66 days.

This patent is subject to a terminal disclaimer.

(21) Appl. No.: 13/716,661

(22) Filed: Dec. 17, 2012

(65) Prior Publication Data

US 2013/0166994 A1    Jun. 27, 2013

(30) Foreign Application Priority Data

Dec. 21, 2011    (EP) .................................... 11194950

(51) Int. Cl.
*G06F 11/10*    (2006.01)

(52) U.S. Cl.
CPC ........ *G06F 11/1032* (2013.01); *G06F 11/1072* (2013.01)
USPC ........... 714/805; 714/773; 714/755; 714/763; 714/766; 714/767; 714/769; 714/774

(58) Field of Classification Search
CPC ............ G06F 11/1076; G06F 11/1008; G06F 11/1032; G06F 11/10
USPC ......... 714/755, 763, 766, 767, 769, 773, 774, 714/805
See application file for complete search history.

(56) References Cited

U.S. PATENT DOCUMENTS 6,757,193 B2    6/2004    Chen et al.
8,578,246 B2 *  11/2013   Mittelholzer et al. ........ 714/773
(Continued)

FOREIGN PATENT DOCUMENTS

CN    1628357 A    6/2005
EP    0969480 A1    1/2000
WO    WO 2007057885 A2    5/2007

OTHER PUBLICATIONS

Gad et al., "Compressed Encoding for Rank Modulation" Information Theory Proceedings (ISIT), IEEE International Symposium Aug. 2011. (5 pages).
Jiang et al., "Rank Modulation for Flash Memories" Information Theory, ISIT 2008, IEEE International Symposium Jul. 2008. (9 pages).
Papandreou et al., "Drift-Tolerant Multilevel Phase-Change Memory" Memory Workshop (IMW), 2011 3rd IEEE International May 2011. (4 pages).
International Search Report and Written Opinion mailed on Apr. 11, 2013 for International Application No. PCT/IB2012/056565 as filed on Nov. 20, 2012.
(Continued)

*Primary Examiner* — Albert Decady
*Assistant Examiner* — Kyle Vallecillo
(74) *Attorney, Agent, or Firm* — Tutunjian & Bitetto, P.C.; Jennifer R. Davis (57) ABSTRACT

Methods and apparatus are provided for reading and writing data in q-level cells of solid-state memory, where q>2. Input data is encoded into codewords having N $q^{ary}$ symbols, wherein the symbols of each codeword satisfy a single-parity-check condition. Each symbol is written in a respective cell of the solid state memory by setting the cell to a level dependent on the $q^{ary}$ value of the symbol. Memory cells are read to obtain read signals corresponding to respective codewords. The codewords corresponding to respective read signals are detected by relating the read signals to a predetermined set of N-symbol vectors of one of which each possible codeword is a permutation.

16 Claims, 6 Drawing Sheets

(56) References Cited

U.S. PATENT DOCUMENTS

| | | |
|---|---|---|
| 2009/0132758 A1 | 5/2009 | Jiang et al. |
| 2009/0132895 A1 | 5/2009 | Jiang et al. |
| 2009/0132985 A1 | 5/2009 | Hsu et al. |
| 2010/0182825 A1 | 7/2010 | Lowrey et al. |
| 2011/0096594 A1 | 4/2011 | Franceschini et al. |
| 2011/0122684 A1 | 5/2011 | Sheu et al. |
| 2011/0296274 A1 | 12/2011 | Mittelholzer et al. |
| 2011/0302475 A1* | 12/2011 | Eisenhuth et al. ............ 714/763 |

OTHER PUBLICATIONS

European Patent Application No. 11183336.4 as filed on Sep. 29, 2011.

Xu, W., et al. "Using Time-Aware Memory Sensing to Address Resistance Drift Issue in Multi-Level Phase Change Memory". Quality Electronic Design (ISQED), 2010 11th International Symposium. Mar. 2010. pp. 356-361.

* cited by examiner

Permutation Code

N=16, q=4, symbol values {0, 1, 2, 3}
Initial vector X0 = [0000111122223333]

Codewords:
{ [0000111122223333], [0001011122223333],

[0010011122223333], [0100011122223333], ⎫
⎬ sequences
⎪ of relative
⋮ ⎬ symbol values
⎪ are unique
[3333222211101000], [3333222211110000] } ⎭

2-state trellis for a length-8 code with q = 4 symbols ℓ = 0, 1, 2, 3

READ/WRITE OPERATIONS IN SOLID-STATE STORAGE DEVICES

BACKGROUND

1. Technical Field

This invention relates generally to read/write operations in solid-state storage devices (SSSDs) and, more particularly, to methods and apparatus for reading and writing data in multi-level cells of solid-state memory.

2. Related Art

In solid-state memory such as flash memory and phase change memory (PCM), the fundamental storage unit (the "cell") can be set to a number of different states, or "levels", which exhibit different electrical characteristics. These different levels can be used to store information. To readout stored information, cell-level is detected via measurements which exploit the differing electrical characteristics to differentiate between different levels. In so-called "single-level cell" (SLC) devices, the memory cells can be set to only two levels and so can record only binary values. Other devices have so-called "multi-level cells" which can be set to q different levels, where q>2. Multi-level NOR flash memories, for instance, can store 4 levels, i.e. 2 bits, per cell. Multi-level cell (MLC) NAND flash memory chips that can store 3 bits of data per single flash cell using 25 nm process technology are currently available. Storage of 2 bits per cell in PCM chips has also been demonstrated.

When writing information to multi-level cells, each cell can be used to store a q-ary symbol with each of the q possible symbol values being represented by a different cell level. On readout of multi-level cells, the read signal level is compared with a set of reference signal levels indicative of the q cell-levels in order to determine which level each cell is set to and thus detect the stored symbol value. However, a problem in multi-level SSSDs is that the physical quantity measured during cell readout, such as electrical resistance in PCM devices, is liable to drift. In particular, the electrical resistance of PCM cells drifts upwards with time in a stochastic manner. This drift can be data-dependent, i.e. may vary for different cell levels. As another example, in flash memory cells the physical quantity measured is the transistor's threshold voltage, and this drifts upwards as a function of the number of write/erase cycles the cell is subjected to. For any given stored symbol value and hence cell level, therefore, the actual read signal level obtained on cell-readout is variable.

Drift is a serious problem for multi-level storage in that it severely compromises reliability. The readback values of neighboring levels may interfere over time, due to upward drift of the lower level towards the upper level, causing a detection error. The closer the initial spacing between levels, the more susceptible they are to drift. Hence, packing higher numbers of levels per memory cell becomes more difficult due to the increased likelihood of error during cell-state detection. On the other hand, packing more bits per cell is a crucial requirement for all memory technologies, being the best known way of reducing manufacturing cost per bit.

A few techniques have been proposed to tackle the problem of drift, but most remain at the academic interest level. One proposal is to use a certain part of the memory cell array as a reference pool of cells. These cells are written with known signal levels, and are continuously monitored during device operation, to obtain estimates of drift. The estimated drift values can then be used to update the reference levels used for level detection on readback. However, drift is a statistical phenomenon and there is significant variability between cells in the array, so reference cells may not be representative and the effectiveness of the proposed reference-cell based approaches will vary substantially over time and over different portions of the memory array. Other drawbacks of this method include: the overhead it entails, which translates to a loss of memory capacity; the penalty in terms of controller complexity and latency due to the readout of the extra cells, and issues related to the management of the pool of reference cells, e.g. wear-leveling issues.

Model-based drift cancellation techniques seek to model drift based on key parameters such as temperature, time and wear, and compensate accordingly. It is, however, difficult to obtain an accurate cell history for the key parameters. There are also fluctuations from cell to cell and there is no well-established analytical model available for short-term drift.

Techniques based on coding have been proposed to address other problems in multi-level memories. For example, rank modulation has been proposed to address endurance problems and overshoot errors in flash memories (see "Rank Modulation for Flash Memories", Jiang et al., IEEE Trans. Inf. Theory, vol. 55, no. 6, June 2009; and US Patent Application Publications No's. 2009/0132895A1 and 2009/0132758A1). While rank modulation may offer some drift benefits, it has two severe drawbacks, namely: (i) it offers only low code rate for a given number of levels; and (ii) it lacks an efficient mapping of data bits into codewords. Hence, rank modulation does not provide a practical solution and is mostly of theoretical interest.

A technique based on coding, and aimed specifically at drift, is detailed in our copending US Patent Application Publication No. 2011/0296274A1. This technique encodes input data as N-symbol codewords of a so-called "translation-stable code". Each codeword symbol can take one of q symbol values and is recorded in a respective q-level cell by setting the cell to a level dependent on the q-ary symbol value. The translation-stable code is such that each possible input data word is mapped by the coding scheme to a codeword with a unique sequence of relative symbol values. Such a code can be constructed from codewords in a set of one or more permutation codes. Each codeword of a permutation code is a particular permutation of a predefined vector (the "initial vector") which has N q-ary symbols arranged in order of increasing symbol value. Detection of codewords on readback can be performed by relating the read signals for codewords to the initial vectors for the code. With a translation-stable code, information is effectively encoded in the relative, as opposed to the absolute, read signal component levels. This feature obviates primary effects of drift on detection accuracy, whereby translation-stable codes can be considered effectively drift-invariant. Translation-stable codes also offer higher code rates than rank modulation schemes for a given number of levels. However, the construction of good translation-stable codes with large minimum-distance and high rates is based on a case-by-case study as there is no systematic approach to design of such codes. Moreover, there is no known simple mapping of data bits into translation-stable codewords and vice versa.

Our copending European Patent Application no. 11183336.4, filed 29 Sep. 2011, discloses a drift-resistant technique for read-detection of permutation-based codes in multi-level SSSDs. The detection system exploits the fact that all codewords are permutations of a known set of vectors, e.g. the initial vectors for a union of permutation codes. The N q-ary symbols of each codeword are again recorded in respective q-level cells by setting the cell-level in accordance with symbol value. Memory cells are read in batches to obtain read signals corresponding to a group of codewords. Each read signal has N signal components corresponding to respective symbols of a codeword, and these components are ordered according to signal level to obtain an ordered read signal for each codeword. Components of these ordered read signals are related to symbols of the known set of initial vectors via a process which involves averaging ordered read signals and relating the average components to symbol values using predefined probabilities of occurrence of different symbol values at different symbol positions as derived from the initial vectors. In this way, reliable estimates can be obtained for the reference signal levels for the q-level cells in the current batch. These reference levels can then be used in codeword detection for the current batch. This self-adaptive technique thus uses the actual cells storing encoded data to estimate the reference levels for those cells on readback, thereby accounting for drift effects on a dynamic basis. The technique is also robust and lends itself to simple, fast decoder implementation. Good, practical encoding schemes for use in such systems nonetheless remain a matter for case-by-case study.

SUMMARY

An embodiment of one aspect of the present invention provides a method for reading and writing data in q-level cells of solid-state memory, where q>2. The method comprises:

encoding input data into codewords having N $q^{ary}$ symbols, wherein the symbols of each codeword satisfy a single-parity-check condition;

writing each symbol in a respective cell of the solid state memory by setting the cell to a level dependent on the $q^{ary}$ value of the symbol;

reading memory cells to obtain read signals corresponding to respective codewords; and detecting the codewords corresponding to respective read signals by relating the read signals to a predetermined set of N-symbol vectors of one of which each possible codeword is a permutation.

Methods embodying this invention encode data for storage in multilevel cells using length-N, $q^{ary}$-symbol codes in which the symbols of each codeword satisfy a single-parity-check (SPC) condition. The SPC condition may apply to the symbols as a whole or to sub-symbols thereof as discussed further below. Methods embodying the invention are predicated on the realization that, because the result of a single parity check is invariant under permutation of its arguments, the codewords of such SPC-based codes are all permutations of an identifiable set of N-symbol vectors (where this set of vectors may in general contain one or more vectors). This permutation feature can be exploited to enable codeword detection. Thus, a practical decoder implementation is available, and advantage can be taken of the benefits offered by SPC-based codes. In particular, SPC-based codes provide good, high-rate codes with large minimum distance. This, in conjunction with efficient permutation-based decoding, offers excellent performance in read/write systems embodying the invention. In addition, many SPC-based codes have simple encoders with efficient mapping of data bits into codewords. This can be exploited in preferred embodiments for exceptionally efficient implementations. In general, the ability to use SPC-based codes in multilevel SSSDs by exploiting the permutation property for decoding offers a systematic approach to the construction of high-rate codes for multilevel SSSDs with simple encoding of user data and good trade-off between gains in minimum distance and rate loss. Moreover, the permutation property of SPC-based codes allows drift-resistant techniques to be implemented as discussed earlier. For instance the read-detection technique of EP 11183336.4 referenced above can be employed in embodiments of the invention. Particularly preferred embodiments employ SPC-based codes which are also translation-stable and hence drift-invariant. Overall, therefore, methods embodying the invention offer very significant advantages in multilevel-cell storage devices.

The single-parity-check condition which the symbols of each codeword satisfy may be that the $q^{ary}$ symbols as a whole, or sub-symbols of these $q^{ary}$ symbols, satisfy a single-parity-check equation. In particular, the SPC-based code may be a single-level code in some embodiments. The codewords may, for example, be codewords of a length-N SPC code. Alternatively the codewords may be codewords of a coset of such an SPC code. In other embodiments, the SPC-based code may be a multilevel code whereby the codeword symbols each comprise a plurality of sub-symbols corresponding to respective code levels. In this case, in each codeword, the N sub-symbols of at least one code level may comply with one of a length-N SPC code or a coset thereof. That is, for at least one code level, each group of N sub-symbols forms a codeword of an SPC code (or coset). Thus, there can be multiple single parity checks each applying to a different code level. Examples of these various SPC-based codes will be given below. With all such codes, preferred embodiments can take advantage of the SPC-based code to perform simple and efficient encoding of input user data. This is discussed further below.

The set of possible (i.e. permitted or "valid") codewords used in the system need not necessarily include all codewords encompassed by the SPC-based code in question. In particular, some embodiments may employ a limited codeword set obtained from a reduced set of basic vectors from which one or more vectors has been eliminated. This is explained in detail below. While this increases encoder complexity, it may be desirable in some embodiments as the reduced vector set simplifies decoding and so may enhance error performance.

The permutation property of the SPC-based codes is exploited for detection purposes by relating the read signals for codewords to the set of vectors of which all codewords are permutations. The particular detection process, and the particular way in which read signals are related to the set of basic vectors during this process, can vary in different embodiments, e.g. depending on the particular SPC-based code employed. The detection process typically involves an ordering of the components of read signals. Specifically, each read signal may comprise N signal components corresponding to respective symbols of a codeword. The components of each read signal are ordered according to signal level to produce an ordered read signal. The components of ordered read signals are then related to symbols of the set of vectors during detection. The details of this process may depend on the particular code, e.g. whether the code is translation stable or not and the number of vectors in the aforementioned set. For codes with a plurality of basic vectors, the relating of read signal components to vector symbols may be performed via an averaging process over a group of ordered read signals, generally as in the permutation-based detection system of EP11183336.4 referenced above. Here, the average components can be related to corresponding symbols in the basic vectors, using the aforementioned probabilities, to derive estimates for the reference signal levels for the q cell-levels. The process can also involve one or more further stage(s) of relating ordered read signals to basic vectors, e.g. via a clustering process, and/or a trellis decoding stage. Detection techniques for various scenarios will be described in more detail below.

An embodiment of a second aspect of the invention provides apparatus for reading and writing data in q-level cells of solid-state memory, where q>2. The apparatus comprises:

an encoder for encoding input data into codewords having N $q^{ary}$ symbols, wherein the symbols of each codeword satisfy a single-parity-check condition;

a read/write controller for writing each symbol in a respective cell of the solid state memory by setting the cell to a level dependent on the $q^{ary}$ value of the symbol, and for reading memory cells to obtain read signals corresponding to respective codewords; and a detector for detecting the codewords corresponding to respective read signals by relating the read signals to a predetermined set of N-symbol vectors of one of which each possible codeword is a permutation.

In general, where features are described herein with reference to a method embodying the invention, corresponding features may be provided in apparatus embodying the invention, and vice versa.

BRIEF DESCRIPTION OF DRAWINGS

Preferred embodiments of the invention will now be described, by way of example, with reference to the accompanying drawings in which.

DETAILED DESCRIPTION OF PREFERRED EMBODIMENTS

Figure 1:
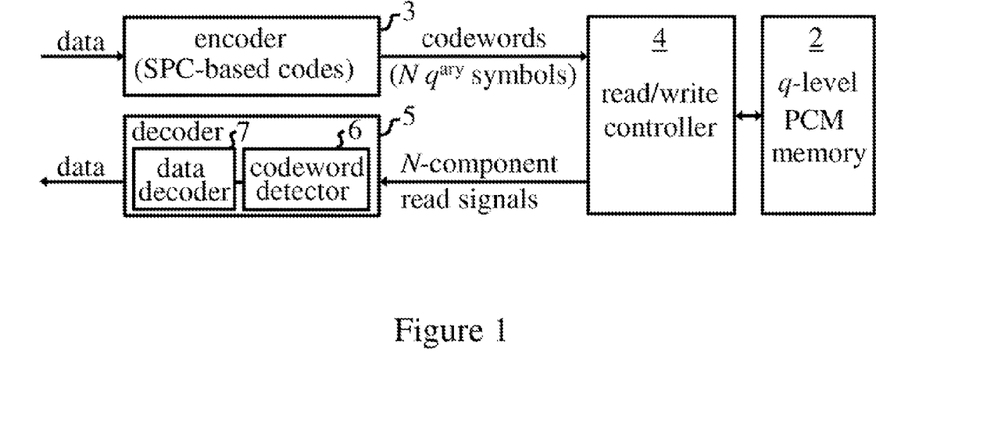
FIG. 1 is a schematic block diagram of a solid-state storage device embodying the invention.

FIG. 1 is a simplified schematic of a solid-state storage device, here a phase-change memory (PCM) device 1, embodying the invention. The device 1 includes phase-change memory 2 for storing data in one or more integrated arrays of multilevel PCM cells. Though shown as a single block in the figure, in general memory 2 may comprise any desired configuration of PCM storage units ranging, for example, from a single chip or die to a plurality of storage banks each containing multiple packages of storage chips. Device 1 includes an encoder 3 for encoding input data in accordance with an SPC-based encoding scheme discussed further below. A read/write controller 4 controls writing of codewords in memory 2 and subsequent reading of memory cells to obtain read signals corresponding to codewords. A decoder 5 for processing the read signals comprises a codeword detector 6, which detects codewords corresponding to the received read signals, and a data decoder 7 which decodes the codewords to recover the original user data.

Each of the PCM cells in memory 2 can be set to one of q>2 nominal levels designated $I_0$ to $I_{q-1}$ herein. Read/write controller 4 can set a cell to a particular level by adjusting the resistance of the cell in known manner. To read a cell, controller 4 applies a small probing signal to obtain a readback signal indicative of the cell's resistance. During write and read operations, controller 4 addresses individual cells in known manner by applying appropriate voltage signals to an array of word and bit lines in memory ensemble 2.

In operation of device 1, the input data to be recorded in memory 2 is supplied to encoder 3. The encoder 3 encodes input data into codewords which have N q-ary symbols $s_n$, n=1, 2, ..., N, where in general N≥q. Hence, the symbols of a codeword can each take one of q possible values ($s_n \in \{0, 1, ..., q-1\}$). The q possible symbol values correspond to respective predetermined levels $I_0$ to $I_{q-1}$ of the q-level cells in memory 2. In this example, a direct correspondence between symbol values 0, 1, ..., q-1 and cell levels $I_0$ to $I_{q-1}$ is assumed for simplicity. Controller 4 stores the N symbols of each codeword output by encoder 3 in respective cells of memory 2 by setting each cell to a level dependent on the symbol value to be stored in accordance with the predefined correspondence between symbol values and cell levels. (Note that, when setting a cell to a given level, the actual resistance value x assumed by the cell may lie within a small interval around the nominal resistance value/for the level due to write noise).

Figure 2:
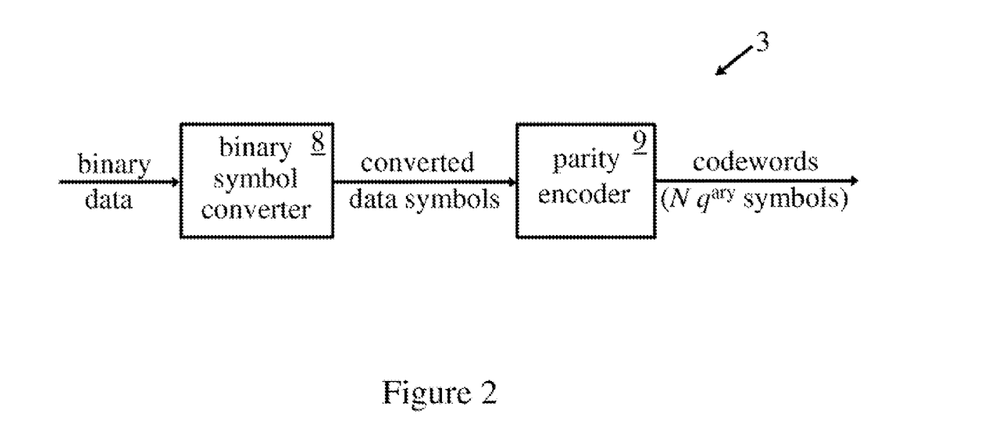
FIG. 2 shows a generalized encoder for the FIG. 1 device.

Encoder 3 implements an SPC-based code such that the N symbols of each codeword satisfy a parity condition. The SPC-based code may in general be a single-level code or a multi-level code. FIG. 2 is a schematic illustration, in generalized form, of a simple encoder for use in preferred embodiments of device 1. The encoder 3 is implemented here by a binary symbol converter 8 and a parity encoder 9. The binary symbol converter 8 maps binary input data symbols into converted data symbols in which the binary data is represented in a different alphabet or alphabets. For single-level codes, the data conversion is performed directly from binary to q-ary data symbols. For multi-level codes, binary data is mapped to groups of "sub-symbols", with respective "sub-alphabets", which in combination represent a q-ary value. This is explained further below. Binary symbol converter 8 thus performs a simple data mapping operation, involving no SPC-based coding. The converted data symbols are then output to parity encoder 9 which encodes successive groups of data symbols into length-N r-symbol codewords whose symbols satisfy the parity condition for the code in question. The encoding involves a simple addition of parity symbols to converted data symbols as discussed further below. The symbol converter 8 can be implemented for preference using hard-wired logic gates or, for example, using a look-up table for the alphabet conversion. The parity encoder 9 can also be implemented in a simple manner using hard-wired logic gates. Suitable implementations will be readily apparent to those skilled in the art from the description herein. Data decoder 7 can be constructed in corresponding manner to perform the inverse of the encoding operation in encoder 3.

In some embodiments, the SPC-based code used in encoder 3 may be a length-N single-parity-check code or a coset of such a code. These are single-level codes. A length-N SPC code over the ring of integers modulo q is defined by the single-parity-check equation:

$$c_1 + c_2 + \ldots + c_N = 0 \pmod{q}$$

where $c_1$ to $c_N$ are the N $q^{ary}$ symbols of a codeword. The cosets of this code are defined by the single-parity-check equation:

$$c_1 + c_2 + \ldots + c_N = p \pmod{q}$$

where p is a predetermined integer between 1 and q−1. Such SPC codes (or cosets) have a rate of (N−1)/N and a minimum Hamming (and Lee) distance of $d_H = d_L = 2$. In operation of the FIG. 2 encoder with such a code, the symbol converter 8 maps binary input data into successive groups of (N−1) $q^{ary}$ data symbols. This mapping of binary to $q^{ary}$ symbols can be achieved in known manner. If q is a power of 2 then the mapping is trivial. Otherwise the mapping can be achieved by performing a base change (i.e. a data conversion) from a binary to a $q^{ary}$ alphabet. In any case, parity encoder 9 then simply encodes each group of (N−1) $q^{ary}$ data symbols into a respective N-symbol codeword by adding a $q^{ary}$ parity symbol so as to satisfy the parity-check equation above.

A particular example of the foregoing is provided by length-9 SPC code over the ring of integers modulo q=5. Such a code can be used with PCM cells for which q=5 nominal cell-levels are defined for data storage. This code is defined by the single-parity-check equation:

$$c_1 + c_2 + \ldots + c_9 = 0 (\text{modulo } 5).$$

With this code, binary symbol converter 8 applies a base change from binary to $5^{ary}$ symbols based on the fact that $2^9 \leq 5^4$. Applying this base change twice (i.e. once to each of two groups of nine input bits), the symbol converter 8 maps eighteen bits into the eight $5^{ary}$ input symbols $(c_1, c_2, \ldots, c_8)$ which are output to parity encoder 9. The parity encoder is implemented as a simple rate-8/9 encoder which maps $5^{ary}$ data symbols into codewords according to the linear mapping:

$$(c_1, c_2, \ldots, c_8) \rightarrow (c_1, c_2, \ldots, c_8, -(c_1 + c_2 + \ldots + c_8)).$$

The encoder 9 thus simply adds a parity symbol $c_9 = -(c_1 + c_2 + \ldots + c_8)$ to the eight $5^{ary}$ input symbols $(c_1, c_2, \ldots, c_8)$. This code has rate 2.06 bit/cell and minimum Hamming distance $d_H = 2$. Comparing this code to the closest equivalent uncoded storage (which uses $q_0 = 4$ nominal cell-levels distributed over the same programming window), the code has an asymptotic coding gain of:

$$s \times d^2_{min} = 9/16 \times 2 = 1.125 (=0.51 \text{ dB})$$

where s is the loss factor for the signal-set expansion from $q_b = 4$ to q=5 equally spaced levels in the interval [0, 1] given by:

$$s = [d_{min}(q_0)/d_{min}(q)]^2 = [(q_0 - 1)/(q_0 - 1)]^2.$$

This code is particularly advantageous in that it is also a translation-stable code. This is discussed further below.

In other embodiments, the SPC-based code used in encoder 3 may be a multi-level code. In this case, the codeword symbols each comprise a group of sub-symbols which correspond to respective code levels. The SPC condition can be imposed here in that the N sub-symbols of at least one code level form a codeword of a length-N SPC code or coset thereof. Two such codes which can be employed in encoder 3 are described in the following.

The first multi-level code is a two-level code of length N=8 using q=4 cell-levels 0, 1, 2, 3 with binary labeling 0↔00, 1↔01, 2↔10, 3↔11 defining the $4^{ary}$ symbol values for the code. The code has a multi-level construction with first and second code levels whose sub-symbols correspond to the most-significant bit (MSB) and least significant bit (LSB) respectively of the 2-bit symbols defined by the labeling scheme. The cell-levels that differ in the MSB only of the corresponding symbol value are 0 and 2, and 1 and 3. In both cases the distance between these levels is two. Hence a code with a squared minimum distance of 2 can be obtained by imposing a single-parity constraint on the sub-symbols of the second code level, i.e. the LSBs, only. The codeword construction for the N=8 code is given by $$(c'_1 c''_1, c'_2 c''_2, \ldots, c'_8 c''_8)$$

where:

eight uncoded data bits form the eight most significant bits $c'_1$ to $c'_8$ of the first code level; seven uncoded data bits form the first seven bits $c''_1$ to $c''_7$ of the second code level; and $c''_8$ is the parity bit calculated such that $c''_1 + c''_2 + \ldots + c''_8 = 0 \pmod{2}$.

With this two-level code, the data conversion required in symbol converter 8 of FIG. 2 is a trivial operation of mapping input bits to sub-symbols $c'_1$ to $c'_8$ and $c''_1$ to $c''_7$. Parity encoder 9 then performs simple encoding of the resulting 15-bits into a length-8 codeword $(c'_1 c''_1, c'_2 c''_2, \ldots, c'_8 c''_8)$ by adding parity bit $c''_8$. This code has a rate of 15/8=1.875 bits/cell and a minimum squared Euclidean distance $d^2_{min} = 2 \times d^2(0,1)$. There is a 3 dB asymptotic gain in exchange for a slight loss in rate from 2 to 1.875 bit/cell.

The second multi-level code is another two-level code of length-8 and is similar to the code just described except that a single-parity constraint is imposed on both code levels. Here, therefore, both the eight LSBs and the eight MSBs comply with a length-8 SPC code (or coset). The codeword construction is again given by $$(c'_1 c''_1, c'_2 c''_2, \ldots, c'_8 c''_8)$$

where:

in level 1, seven data bits $c'_1$ to $c'_7$ determine the parity bit $c'_8$; and in level 2, seven data bits $c''_1$ to $c''_7$ determine the parity bit $c''_8$.

With this code, the data conversion required in symbol converter 8 is a trivial mapping of fourteen input bits to $4^{ary}$ symbols $c'_1 c''_1$ to $c'_7 c''_7$. Parity encoder 9 then performs simple linear encoding of these fourteen bits into a length-8, $4^{ary}$ codeword by calculating and adding the parity bits $c'_8 c''_8$ as the final codeword symbol. This code has a rate of 14/8=1.75 bits/cell, and a minimum squared Euclidean distance $d^2_{min} = 2 \times d^2(0,1)$. There is a 3 dB asymptotic gain in exchange for a slight loss in rate from 2 to 1.75 bit/cell. Although the code rate is lower due to parity coding of both code levels, the resulting code has a smaller set of initial vectors which are exploited in the decoding process discussed below. This reduces the likelihood of error in the decoding process, offering improved accuracy on readback.

While particular examples of single and multi-level SPC-based codes are given above, similar principles can be applied to obtain numerous other useful SPC-based codes for embodiments of the invention. The principles of such multi-level codes are generally known from communications theory, and similar principles can be applied here to obtain codes for use in multilevel storage device 1. In general, provided q is not prime, the $q^{ary}$ alphabet of a code can be decomposed into a Cartesian product of sub-alphabets for the different code levels which can be endowed with a field or additive group structure. For example, a $q^{ary}$ alphabet can be decomposed into a binary and a ternary sub-alphabet, which results in the algebraic structure Z/2Z×Z/3Z. Thus in general for multi-level codes, encoder 3 maps binary data to groups of sub-symbols, with respective sub-alphabets, which in combination represent a $q^{ary}$ value. A single-parity constraint can be imposed on one or more of the different code levels. For any code level having a parity constraint, encoder 3 encodes groups of (N−1) sub-symbols of that code level into the N sub-symbols of that level in respective codewords of the overall SPC-based code.

It will be seen that the above parity-based codes offer high-rate codes with good minimum distances and can be implemented in a simple manner using a base change and simple linear encoding. The codes thus provide a simple mapping of input data to codewords and simple encoder construction. Moreover, consideration of these SPC-based codes shows that the codes are invariant under permutation of their arguments, the parity condition being satisfied for all permutations of the symbol set $(c_1, c_2, \ldots, c_N)$. It follows that all codewords of such a code are permutations of an identifiable subset of the codewords. This subset constitutes a set of N-symbol vectors for the code such that each possible codeword is a permutation of one vector in the set. Hence, these codes can be viewed as a union of permutation codes. A permutation code is characterized by a real vector of length-N (the "initial vector") on which the permutation group of N letters operates. The code is completely determined by its length-N and the initial vector X0 which has N components (symbols). The codewords consist of all length-N vectors that are obtained through a permutation of the components of the initial vector. The SPC-based codes described above can be viewed as a union of length-N permutation codes, whereby each possible codeword is a permutation of one of a set of N-symbol vectors being the set of initial vectors of the permutation codes.

The permutation property of the SPC-based codes described herein provides the basis for efficient decoding of these codes. In particular, the read signals obtained for codewords on readback can be related to the predetermined set of N-symbol vectors for the code as the basis of the codeword detection process. The relating of read signals to vectors can be performed in a variety of ways depending on the particular code employed and the overall detection process in which is it used. Examples of preferred detection techniques are described in the following. These are based on the drift-resistant techniques described in our European Patent Application no. 11183336.4, referenced above, the relevant content of which is incorporated herein by reference. The detection methods to be described are performed by codeword detector 6 of device 1. The codeword detector comprises control logic for implementing the various steps of the codeword detection process, and this control logic may be embodied in hardware or software or a combination of hardware and software components. Suitable implementations will be readily apparent to those skilled in the art from the description of operation herein.

For the first detection method to be described, blocks of codewords are written/read substantially simultaneously to memory 2 by read/write controller 4. In a read operation, the memory cells storing a group of B codewords are read to obtain B real-valued read signals y each having N signal components $y_n$, n=1, 2, ..., N, indicating the read-back resistance values of the sequence of cells storing the N symbols of a codeword. The read signals y are supplied to codeword detector 6. The signal components $y_1, \ldots y_N$ of each read signal correspond to respective symbols $S_1, \ldots s_N$ of a stored codeword. The read-back resistance levels y corresponding to a given symbol value s are variable due to drift and noise effects. Drift is of stochastic nature and is modeled here as a deterministic part f (average trend due to drift) and a stochastic part g (drift and noise) which is data-dependent:

$$y = f(x,t) + g(x,t)$$

where y is the drifted level, x is the original stored value, t is time, f(x,t) is a monotonic function of x for all fixed t (i.e. levels maintain their order over time), and g(x,t) is a random process capturing the data-dependent nature of noise. For fixed x and t, additive noise is modeled as Gaussian with zero mean and data-dependent variance:

$$g(x,t) \sim N(0, \sigma(x))$$

Hence, the readback resistance level distributions shift in time, with changing means and potentially variances, and are level-dependent, having data-dependent means and variances. For accurate detection of codewords from read signals y, codeword detector 6 must account for the variable resistance level distributions. Most fundamentally, the codeword detector requires estimates for the reference signal levels which correspond to the different cell levels $I_0$ to $I_{q-1}$, and hence to the different symbol values, for the read operation. These reference signal levels can then be used for codeword detection. An overview of the codeword detection process is given below with reference to the flow diagram of FIG. 3. For the ensuing description, we assume that encoder 3 employs an SPC-based code which is a union of L permutation codes defined by the set of L initial vectors $c^{(1)}, c^{(2)}, c^{(L)}$, each of length N, whose symbols are ordered in order of increasing symbol value.

Figure 3:
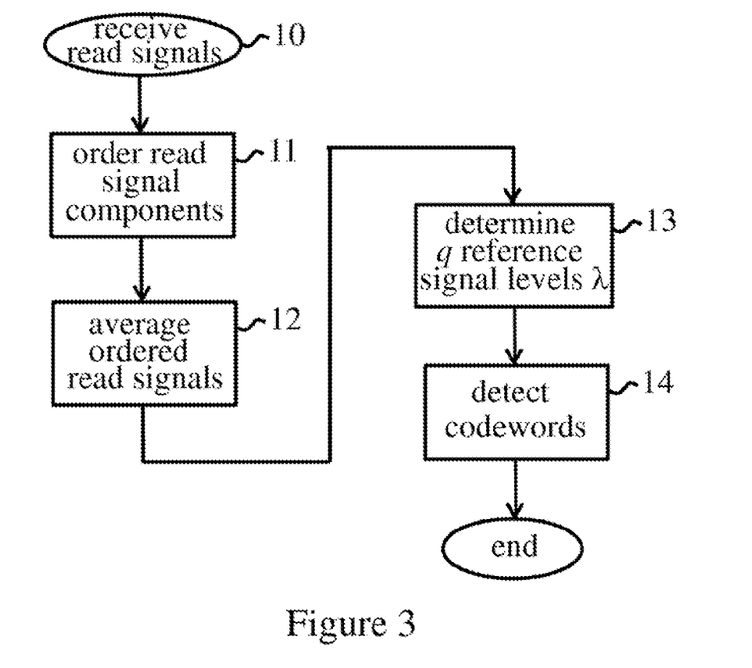
FIG. 3 indicates key steps in operation of an exemplary codeword detector in the FIG. 1 device.

FIG. 3 indicates the main operational steps performed by codeword detector 6. As indicated at step 10, detector operation commences on receipt of a group of B read signals y from controller 4 corresponding to a group of B codewords read from memory 2. The read signals y are temporarily stored in codeword detector 6 for use in the subsequent processing operation. Next, in step 11, the control logic of detector 6 orders the components $y_1$ to $y_N$ of each read signal y according to signal level. In particular, the read signal components are ordered in order of increasing signal level (reflecting the symbol order of the initial vectors here), to produce a group of B ordered read signals $z^i$:

$$z^i = [y_{k_1}^i, y_{k_2}^i, \ldots, y_{k_N}^i], y_{k_1}^i \leq y_{k_2}^i \leq \ldots \leq y_{k_N}^i, \text{ where } i = 1, \ldots, B \quad (1)$$

This ordering process defines a permutation ($k_1$ to $k_N$) of the signal components for each read signal y. The resulting ordered read signals are stored in codeword detector 6. Next, in step 12, the detector logic averages corresponding components of the ordered read signals to obtain an "average" read signal 5, at time t:

$$\bar{z} = [\bar{z}_1 \ldots \bar{z}_N], \bar{z}_n = \frac{1}{B} \sum_{i=1}^{B} y_{k_n}^i, n = 1, \ldots, N \quad (2)$$

Thus, the first, second, ..., Nth components of the ordered read signals are averaged over the B signals to produce the average read signal $\bar{z}$. (A straightforward, unweighted averaging process is performed for simplicity in this example, though a weighted average could be envisaged for other embodiments if desired). In step 13, the detector logic determines a current reference signal level λ corresponding to each of the q levels of the memory cells. For the q nominal cell levels $I_0$ to $I_{q-1}$ at time t=0, the corresponding drifted levels at time t are denoted by $\lambda_0$ to $\lambda_{g-1}$. These reference signal levels $\lambda_0$ to $\lambda_{g-1}$ are calculated in detector 6 using the average read signal $\bar{z}$ and a set of probabilities which are predefined in detector 6 based on the particular code C employed in encoder 3. These specify the probabilities of occurrence of each possible symbol value at each symbol position in a codeword whose symbols are ordered according to symbol value. In particular, considering the ordered code $C^0$, in which all codewords $X = [X_1, X_2, \ldots, X_N] \in C$ have been replaced by their ordered versions $X^0$:

$$X^0 = [X_{k1}, X_{k2}, \ldots, X_{kN}] \text{ with } X_{k1} \leq X_{k2} \leq \ldots \leq X_{kN}$$

the stochastic (N×q)-matrix $P = [p_{nm}]$ is defined as:

$$p_{nm} = \text{prob}\{X^0_n = S_m\}$$

where n=1 to N, m=0 to q−1, and $S_1, S_2, \ldots, S_{q-1}$ are the symbol values $0, 1, \ldots, q-1$ respectively. Such a matrix can be defined for any code C based on the known code structure, i.e. the set of valid codewords for the code. This will be illustrated by example below.

Assuming that, at each memory-write operation, B codewords are selected randomly from the code and written simultaneously to the PCM array as described above, then the recorded signals $x=[x_1, x_2, \ldots, x_n]$ for the B codewords (if rearranged as their ordered versions $x^o=[x_{k1}, x_{k2}, \ldots, x_{kn}]$ with $x_{k1} \leq x_{k2} \leq \ldots \leq x_{kn}$) satisfy the relation:

$$\frac{1}{B}\sum_{i=1}^{B} x^{(i)oT} = P[l_0, \ldots, l_{q-1}]^T + (\text{error vector}) \quad (3)$$

where $x^{(i)o}$ is the set of ordered write signals and the superscript T denotes the vector transpose. Note that if all codewords are used the error vector is essentially zero. On readback, the resulting read signals y are ordered and averaged as described in steps 11 and 12 of FIG. 3. The original nominal cell levels $l_0, \ldots, l_{q-1}$ have drifted over time and the levels $\lambda_0$ to $\lambda_{q-1}$ at time t are given by $\lambda_m = f(l_m, t)$, m=0, q−1. As f(.) is monotonic, the same stochastic matrix P defined above gives a relation analog to (3) between the levels $\lambda_m$ and the components of the average read signal $\bar{z}$. In particular, when subject to the channel distortion $y=f(x, t)+g(x, t)$ as defined earlier, the average read signal $\bar{z}$ satisfies the relation:

$$\bar{z}^T = P[\lambda_0, \lambda_1, \ldots, \lambda_{z-1}]^T + e \quad (4)$$

(where, if the group B consists of all codewords, then the error e is the average (component by component) of the zero-mean noise samples vector g, which is expected to be essentially zero). Equation (4) represents an over-determined system of N linear equations which can be solved in known manner for the q unknowns $\{\lambda_0, \lambda_2, \ldots, \lambda_{q-1}\}$.

The above process will now be illustrated for an exemplary code based on the union of four permutation modulation codes with initial vectors $c^{(j)}$ given below. (Note that this code is not itself an SPC-based code and is used simply to illustrate the reference level estimation technique described).

$c^{(1)}$=[0112233] #Π($c^{(1)}$)=630

$c^{(2)}$=[0011223] #Π($c^{(2)}$)=630

$c^{(3)}$=[0001233] #Π($c^{(3)}$)=630

$c^{(4)}$=[0012333] #Π($c^{(4)}$)=630

There are 2100 codewords, consisting of a number of permutations of each initial vector as indicated by #Π($c^{(j)}$). Assuming all codewords are equally likely, then the probabilities defining the probability matrix P described above depend on the structure of the initial vectors and the number #Π($c^{(j)}$) of codewords which are permutations of each vector. In particular, the probabilities $p_j(j=1, \ldots, L)$ of occurrence of the initial vectors $c^{(j)}$ can be easily calculated as:

$p1=p2=63/210$;

$p3=p4=42/210$.

If we denote the initial vectors at time t as $u^{(j)}=F\{c^{(j)}\}=[u_1^{(j)}, \ldots, u_N^{(j)}], j=1, \ldots, L$ then, based on equation (1) above, the components $z_n$ of the average read signal can be expressed as:

$$z_n = \frac{1}{B}\sum_{i=1}^{B} y_{k_n}^i = \sum_{j=1}^{L} p_j u_n^{(j)} + e_n, n=1, \ldots, N \quad (5)$$

This equation can be rewritten in matrix form, corresponding to equation (4) above, as:

$$\bar{z} = P \cdot \lambda \quad (6)$$

where $\bar{z}=[z_1, \ldots, z_N]^T$, and $\lambda=[\lambda_0, \lambda_1, \ldots, \lambda_{q-1}]^T$ is the vector of reference signal levels at time t. The matrix P is thus defined by the probabilities of occurrence of the initial vectors and the symbol values at each symbol position in the initial vectors. In particular, relating the symbol values 0 to 3 in the initial vectors above to reference levels $\lambda_0$ to $\lambda_3$ via equation (6) gives:

$(p_1 + p_2 + p_3 + p_4) \cdot \lambda_0 = z_1$ $(p_2 + p_3 + p_4) \cdot \lambda_0 + p_1 \cdot \lambda_1 = z_2$ $\ldots$ $(p_1 + p_2 + p_3 + p_4) \cdot \lambda_3 = z_7$ As N≥q, this set of linear equations can be solved in known manner for the unknown reference levels $\lambda_0, \ldots, \lambda_3$. In this preferred embodiment, detector 6 solves the equations using a least-squares method as is well known to those skilled in the art.

It will be seen that, in the above process, the ordered read signals for codewords are related to symbols of the set of initial vectors via an averaging process over a group of ordered read signals using the predefined probabilities of occurrence of each symbol value at each symbol position in a said codeword whose symbols are ordered according to symbol value. These probabilities depend on the values of symbols of the initial vectors at positions corresponding to respective components of the average read signal, and thus inherently involve relating the ordered read signal components to initial vectors as described above. This relation is used to obtain estimates of the reference levels from the ordered averaged read signals. The resulting estimates for the reference signal levels $\lambda_0, \ldots, \lambda_3$ for the q cell-levels can then be used to detect the current batch of codewords. In some embodiments, the reference signal levels $\lambda_0$ to $\lambda_3$ could be used directly for codeword detection by comparing the components $y_n$ of each read signal y with these levels to identify the particular cell level, and hence symbol value, to which each read signal component corresponds. However, preferred embodiments offer improved detection accuracy by using the reference signal levels $\lambda_0$ to $\lambda_3$ to identify the initial vector of which the codeword corresponding to each read signal is a permutation. In effect, the read signals are divided into clusters, each cluster containing read signals representing codewords which are permutations of the same initial vector. Examples of such techniques will now be described with reference to FIGS. 4 and 5.

Figure 4:
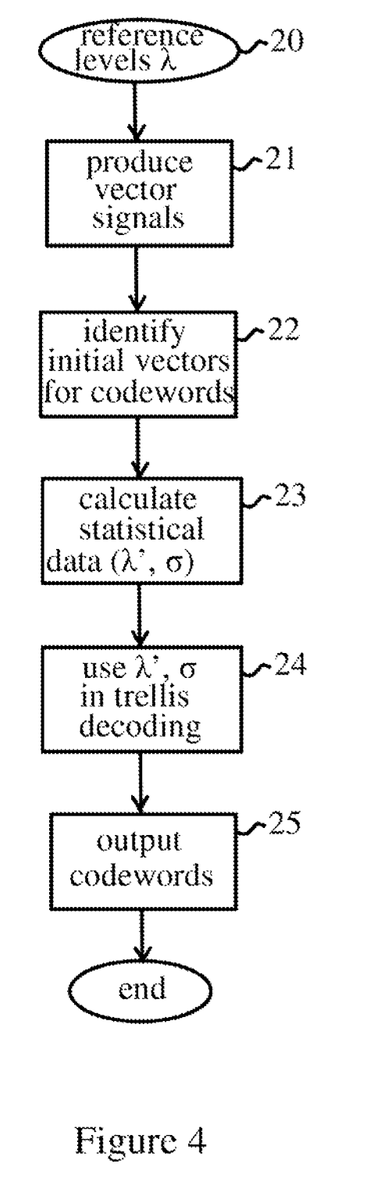
FIG. 4 indicates further steps of a first codeword detection method.

FIG. 4 shows the main steps of a first detection process which can be performed by codeword detector 6. The operation commences at step 20 with determination of the current reference signal levels $\lambda_0$ to $\lambda_{q-1}$ as already described. Next, in step 21, the detector produces a vector signal corresponding to each initial vector by replacing each symbol of the vector by the reference signal level $\lambda$ corresponding to the symbol value. That is, each initial vector $c^{(j)}$ is mapped to its counterpart $u^{(j)}$ at time t with real physical quantities (the reference signal levels λ) as components:

$$c^{(j)} \to F\{c^{(j)}\} = u^{(j)} = [u_1^{(j)}, \ldots, u_N^{(j)}], j=1, \ldots, L$$

Figure 5:
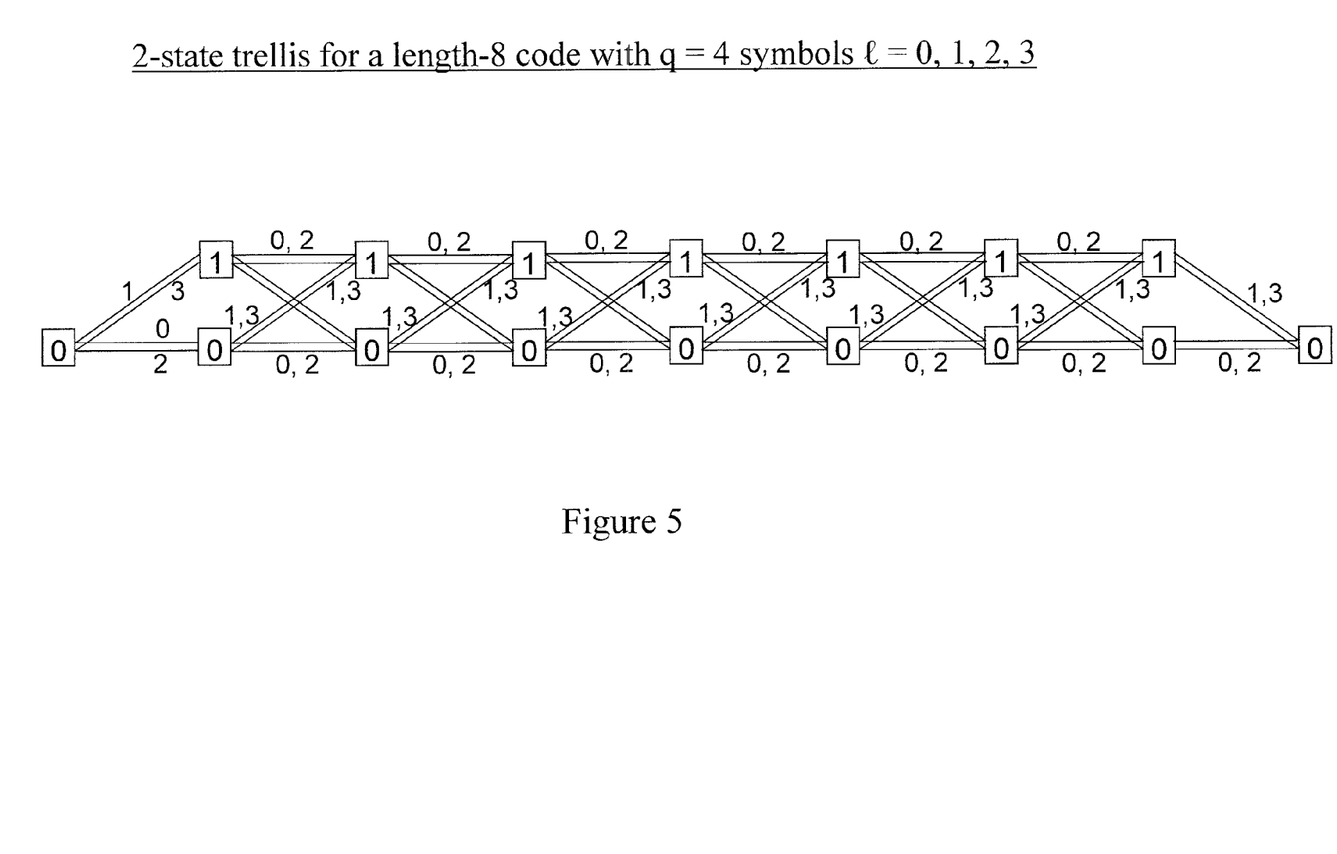
FIG. 5 shows an exemplary trellis diagram for use in the method of FIG. 4.

That is, the i-th component $c_i^{(j)}$ of $c^{(j)}$ is mapped into $u_i^{(j)}$ using the current reference level estimates $\lambda_m = f((l_m, t))$, m=0, 1, ..., q−1. The resulting vector signals u(j) are then used to divide the group of B ordered read signals $z^i$ (from step 11 of FIG. 3) into clusters corresponding to respective initial vectors $c^{(j)}$. Specifically, in step 22, the initial vector of which the codeword corresponding to each ordered read signal $z^i$ is a permutation is identified by determining which vector signal $u^{(j)}$ is closest to that ordered read signal:

closest initial vector $c^{(r)} = [c_1^{(r)}, \ldots, c_N^{(r)}], r = \arg\min_j\{|z^i - u^{(j)}|\}$, where j=1, ..., L. The minimum can be assessed here using any convenient minimum distance criterion, e.g. using a simple Euclidean distance metric. Next, in step 23, the detector logic calculates statistical data for the distribution of the read signal component levels corresponding to each of the q nominal levels of the memory cells. In particular, by relating the ordered read signal components to the symbols of the initial vectors in the various clusters, the read signal level distributions for each of the q cell-levels are obtained. These distributions are then processed to obtain the means and variances in each case. The mean values so obtained for the q cell-levels are denoted by $\lambda'_0$ to $\lambda'_0$ and represent updated values for the reference signal levels λ used in initial clustering step 22. The variances for each level distribution are denoted by σ. In step 24 of FIG. 4, the detector logic uses the means $\lambda'$ and variances a in a trellis decoding operation. Trellis decoding is well known in the art and need not be described in detail here. Suffice to say that, for a single parity check on an r-level alphabet in an SPC-based code described herein, detection via a MAP (maximum-a-posteriori) method or a ML (maximum-likelihood) method can be efficiently implemented by a trellis with at most r states. By way of example, 2-state trellis for the first two-level code described above, with parity coding on the least-significant bit, is shown in FIG. 5. The second two-level code, with parity coding on both the LSB and MSB, can be decoded using a 4-state trellis. An appropriate trellis diagram for any given parity code will be apparent to those skilled in the art.

The codeword detected in step 24 for each of the group of B read signals is then output by codeword detector 6 in step 25 of FIG. 4. (Note that, if some operational error results in detection of an invalid codeword here then detector 6 simply outputs an erasure symbol for that codeword. This can be addressed by some suitable error-correction processing in data decoder 7. Such processes are well known to those skilled in the art and need not be addressed here). The codeword detection process is then complete.

Figure 6:
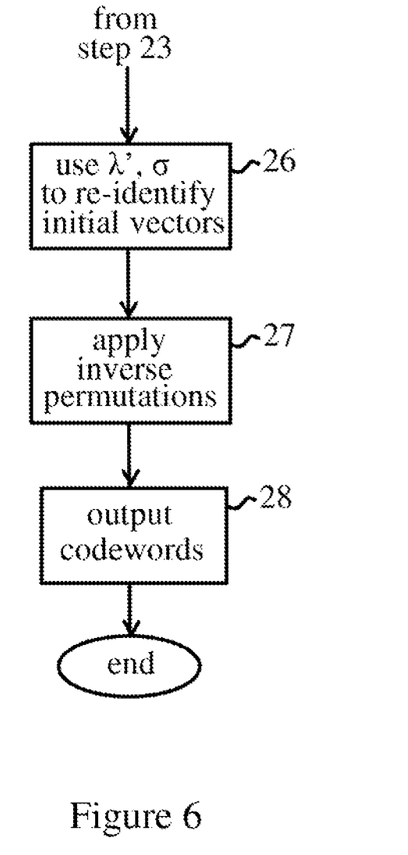
FIG. 6 indicates steps of a second codeword detection method.

FIG. 6 indicates a modification to the FIG. 4 technique. This uses permutation-based detection instead of the trellis decoding step of FIG. 4. In particular, referring back to Equation (1) above, the process of ordering read signals defines a permutation ($k_1$ to $k_N$) of the signal components for each read signal y. This permutation is used in the detection method of FIG. 6. The FIG. 6 method commences with steps 20 to 23 of FIG. 4 as before. In step 26, however, the detector logic uses the means 80' and variances σ in a second pass of the clustering operation initially performed in step 22. Hence, the initial vector to which each ordered reads signal corresponds is again identified, this time using the statistical data ($\lambda'$, σ) for the level distributions. This process is preferably based on one of MAP and ML detection, such methods being well known to those skilled in the art. In this example, the closest initial vector $c^{(r)}$ for each ordered read signal $z^i$ is identified as:

$$c^{(r)} = [c_1^{(r)}, \ldots, c_N^{(r)}], r = \arg\max_{j=1, \ldots L}\{Pr(z^i | c^{(j)})\},$$

an ML technique being employed here where:

$$Pr(z^i | c^{(v)}) = \left(\frac{1}{\prod_{n=1}^{N} 2\pi(\sigma_n^v)^2}\right)^{\frac{1}{2}} \exp\left[-\frac{1}{2}\sum_{n=1}^{N}\left(\frac{z_n^i - \mu_n^{(v)}}{\sigma_n^{(v)}}\right)^2\right] \quad (7)$$

where: $z_n^i$ are the components $z_1^i, z_2^i, \ldots, z_N^i$ of ordered read signal $z^i$;

$\mu_n^{(v)}$ corresponds to initial vector $c^{(v)}$ with symbols replaced by the corresponding mean reference levels $\lambda'$; and $\sigma_n^{(v)}$ represents the standard deviation of the distribution for the reference level with mean $\lambda'$ which corresponds to each component of $\mu_n^{(v)}$.

Having effectively re-clustered the read signals y according to the initial vector identified using the statistical data in step 25, in step 27 the detector logic can detect the codeword corresponding to each read signal by applying an inverse permutation to the initial vector identified for the read signal. For a given read signal, the inverse permutation is simply the inverse of the permutation ($k_1$ to $k_N$) of that read signal which produced the ordered read signal via (1) above. The resulting codeword for each read signal (or an erasure signal if no valid codeword is detected) is then output in step 28, and the process is complete.

Figure 7:
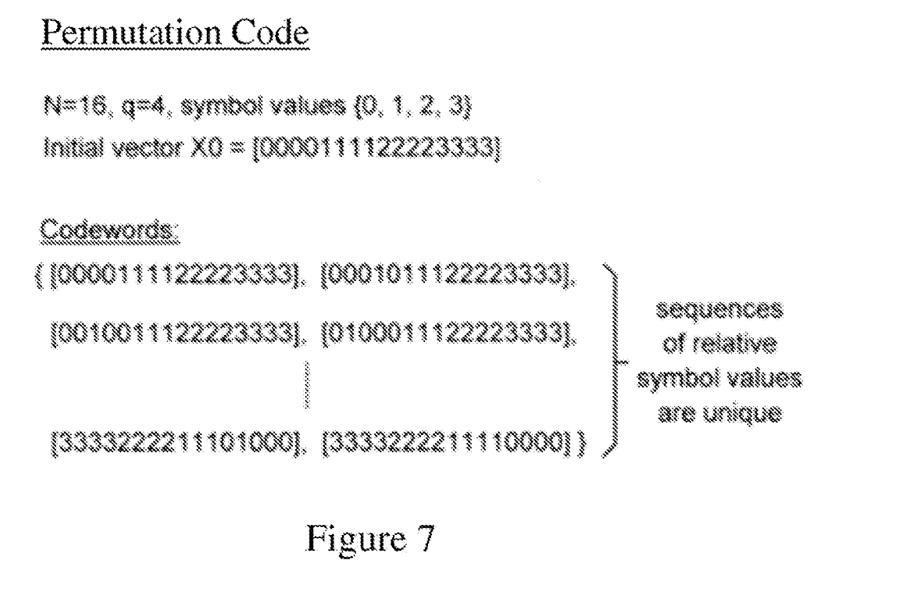
FIG. 7 illustrates construction of a simple translation-stable code.

The above techniques exploit the permutation property of SPC-based codes to achieve efficient, drift-resistant decoding in device 1. In particular, the detection process is independent of underlying drift characteristics (as long as drift does not reorder the resistance levels), and also accounts for data-dependent noise whereby different cell-levels are subject to differing noise effects. Moreover, some SPC-based codes are also translation-stable codes and as such are fundamentally drift-invariant. Translation-stable codes are defined and described in US 2011/0296274A1, mentioned earlier, the relevant content of which is incorporated herein by reference. Briefly, however, with a translation-stable encoding scheme, each data word in the set of all possible input data words is encoded as a codeword with a unique sequence of relative symbol values. This can be understood by considering the simple translation-stable code of FIG. 7. This code is a permutation code with N=16 and q=4. The initial vector X0 in this example is as shown in the figure. The set of codewords {c} for the code C consists of all possible permutations of the initial vector X0 as indicated in the figure. Inherent in this code is that each of these codewords has a unique sequence of symbol values relative to the lowest symbol value in the codeword, whereby adding any real-valued number to all symbol values in a codeword does not result in another codeword. In particular, if we define the translation vector t=[1 1 1 . . . 1] of length N, here 16, then for all codewords c in the code C:

$$(c + Rt) \cap C = c$$

where R is the set of real numbers. This provides the definition of a "translation-stable" code herein for any N-symbol, q-ary alphabet code $C \subseteq \{0, 1, \ldots, q-1\}^N \subseteq R^N$. While FIG. 7 shows a single permutation code, other translation-stable coding schemes can be based on a union of permutation codes. Such a translation-stable code C can thus be defined as:

$$C \subset \Pi(c^{(1)}) \cup \Pi(c^{(2)}) \ldots \cup \Pi(c^{(L)})$$

where $c^{(1)}$, $c^{(L)}$ are L unique initial vectors; $\Pi(c^{(L)})$ denotes the permutation modulation code with initial vector $c^{(j)}$; and $C \cap \cup \Pi(c^{(j)}) \neq \emptyset$. With translation-stable codes, because each possible dataword maps to a codeword with a unique sequence of relative symbol values, input data is effectively encoded in the relative, as opposed to the absolute, symbol values. The correspondence between symbol values and memory cell levels means that codewords will be recorded as correspondingly unique sequences of relative levels in memory 2. Provided any drift-induced shift in the cell levels does not change the basic level order, this shift will not change the relative level sequences and so will not affect the information recorded. By detecting the relative level sequences on read-back, the correct codewords and hence data words can be recovered regardless of the drift-induced shift. Translation-stable codes are thus highly-advantageous, being particularly robust to drift effects. Hence, SPC-based codes which are also translation-stable codes can be selected for use in some embodiments of device 1, providing benefits associated with both of these code-types. The length-9, $5^{ary}$ SPC code detailed earlier is a particular example of such a translation-stable SPC-based code. Other translation-stable codes can be readily identified, for example, by considering codes for which the code-length is an odd number N=2 m+1 with the requirement that the sum of the N symbols is zero (modulo q).

In the above embodiments using the simple encoder construction of FIG. 2, all potential codewords of the SPC-based code, i.e. all N-symbol words satisfying the necessary parity constraint, are exploited in the code. This is not, however, essential. In some applications it may be preferable to use a limited set of codewords. In particular, this limited codeword set may exclude length-N $q^{ary}$ symbol words whose symbols satisfy the SPC condition but which are contained in the set of all permutations of at least one N-symbol vector having a smaller orbit under permutation than vectors in said predetermined set. That is, starting with the set of initial vectors for the "complete" code, one or more vectors which have the smallest orbit under permutation are eliminated. All codewords which are permutations of the eliminated initial vector(s) are excluded from the code. More generally, given an SPC-based code with A codewords, $2^{K-1} < A \leq 2^K$, one can reduce the original number of initial vectors to a smaller number M by selecting the M initial vectors that have the largest orbit under the permutation group such that the total number of codewords in the reduced code is at least $2^{K-1}$. As an example, for a 2-level SPC-based code with N=8, q=4, one can reduce the number of initial vectors from 85 to M=12 and still generate 16800 out of the 32768 codewords. Thus, there is room for $2^{14}$=16384 codewords and the code rate reduces from 15/8=1.875 to 14/8=1.75 bit/cell.

Where the codeword set of the SPC-based code is limited as above, the encoder 3 must perform coding by mapping input data into the remaining codewords. This could be implemented, for example, by using a look-up table, in particular for small codes, or using the well-known technique of enumerative source coding for more efficient operation with large codes. Decoding of this type of code can be performed, for example, using the detection process of FIG. 6. In any case, by eliminating initial vectors as described, there are fewer initial vectors to be considered during detection whereby detection performance may be enhanced. Simulation results indicate that such "reduced codes" perform well even small batch sizes B.

Figure 8:
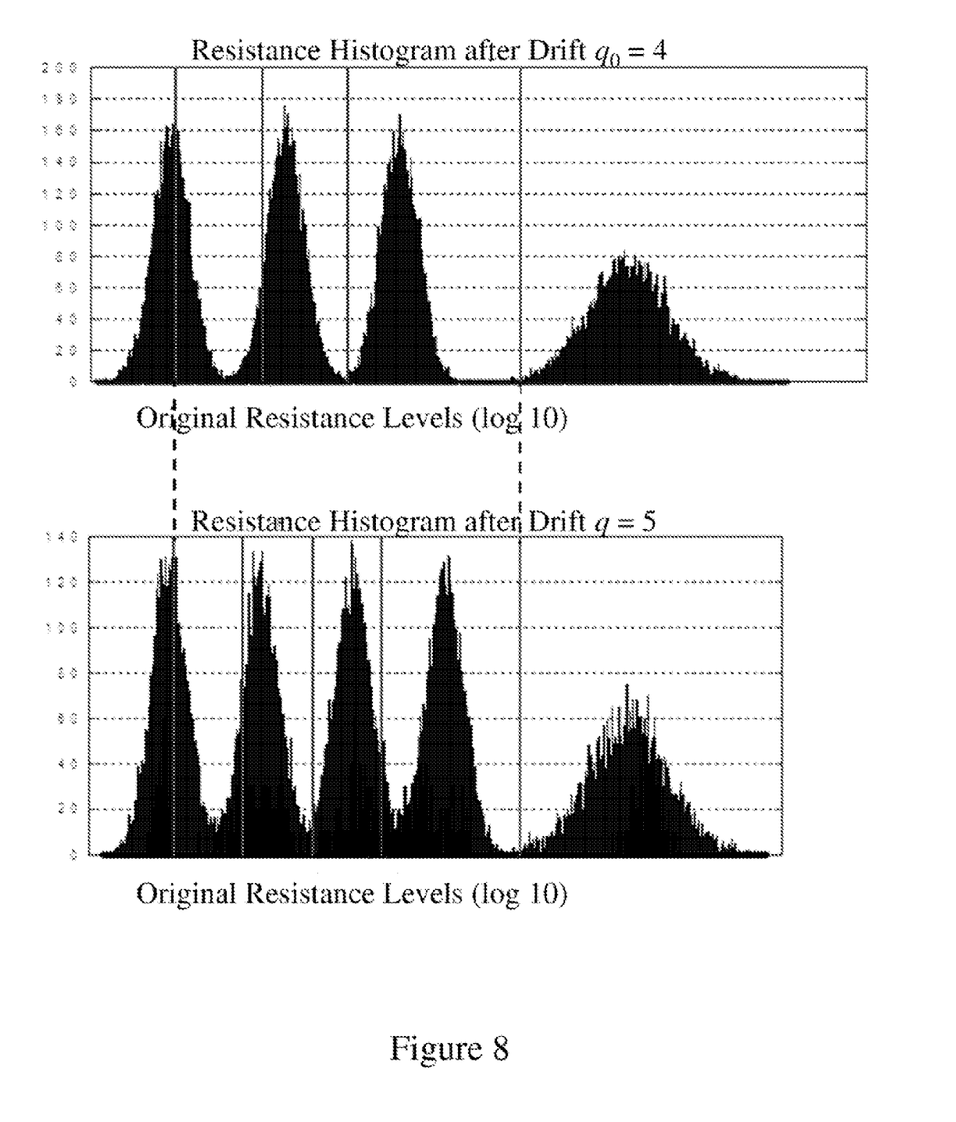
FIG. 8 illustrates drift in relation to nominal resistance levels for 4-level and 5-level PCM cells.
Figure 9:
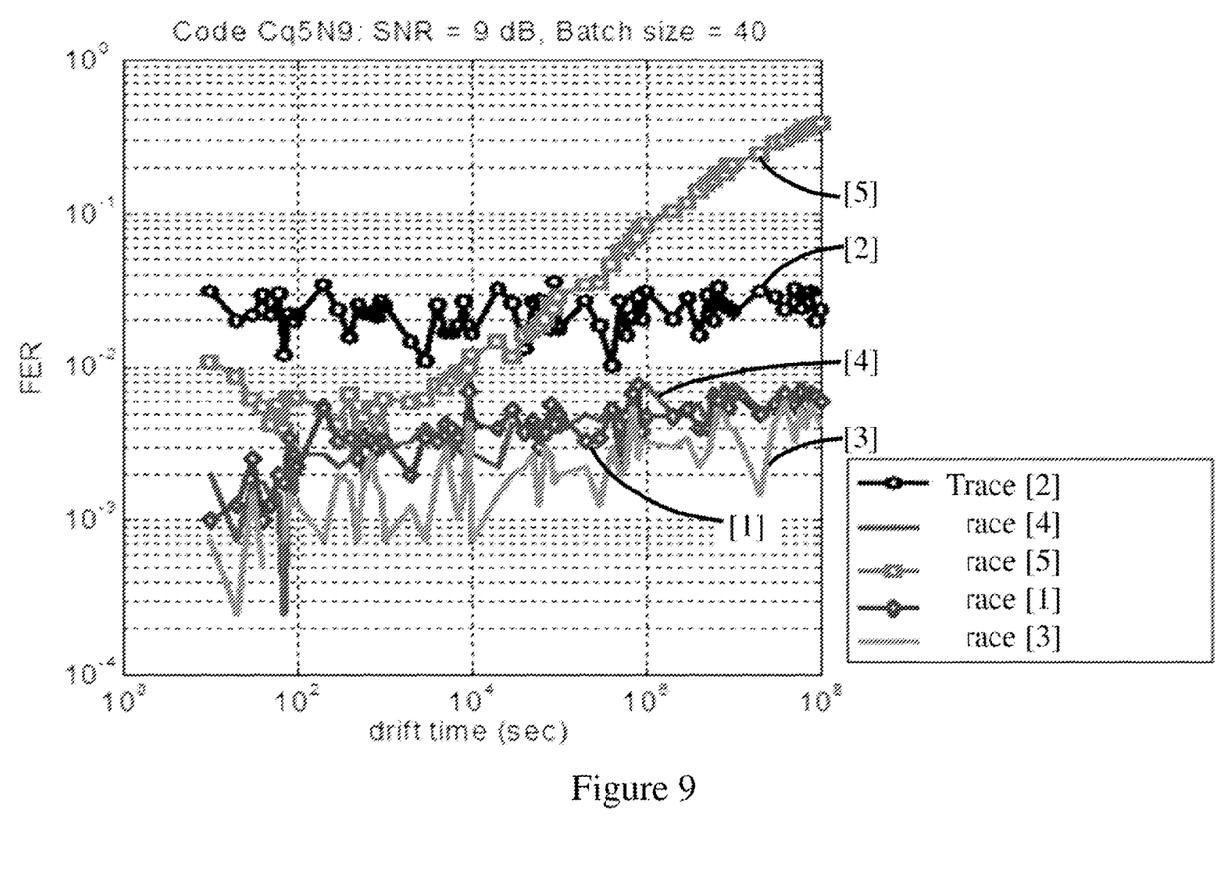
FIG. 9 compares error performance of an embodiment of the invention and an uncoded scheme with various detection methods.

Performance results for an exemplary SPC-based code are discussed below in connection with FIGS. 8 and 9. The code considered here is the length-9 translation-stable SPC code described above. The simulation results of FIG. 8 show resistance histograms after drift for $q_b$=4 cell-levels (top) and q=5 cell-levels (bottom) where the levels are unequally-spaced over the same programming window. This illustrates the drift process with data-dependent noise variances. The nominal programmed cell-levels in the upper histogram are [4.0, 4.5, 5.0, 6.0] in logR. The standard deviation of noise per level is [1, 1, 1, 3]×6. In the lower histogram the nominal cell-levels are [4.0, 4.4, 4.8, 5.2, 6.0] in logR and the standard deviation of noise per level is [1, 1, 1, 1, 3]×6. FIG. 9 compares error performance of the N=9, q=5 SPC code with an uncoded N=9, $q_0$=4 scheme with various detection methods. The performance results were obtained by Monte Carlo simulations by processing a large number of codeword batches with batch size B=40. The trace labeled [1] corresponds to the SPC code with trellis or permutation-based decoding as in FIG. 4 or 6 above. Trace [2] is the equivalent result for the uncoded case with permutation-based decoding. Trace [3] is for the SPC code but using a genie (i.e. an impractical detector that has perfect knowledge of all memory cell data and hence drift) to perform a model-based correction for drift. Trace [4] is the equivalent result for the uncoded scheme with genie-aided detection. To illustrate the drift effect, trace [5] shows the result for the SPC code but using the original, nominal reference levels/at time zero in decoding. It is apparent from this figure that the 5-level SPC scheme outperforms the 4-level uncoded scheme with equivalent detection methods. The coded scheme is more robust against data-dependent noise and its performance is significantly closer to the genie-aided performance than the uncoded scheme.

It will be seen from the foregoing that embodiments of the invention provide significant improvements in multilevel solid-state storage devices. The use of SPC-based codes offers a systematic approach to the construction of high-rate codes with simple encoding of user data, which provide a good trade-off between minimum distance and rate loss. The permutation property of these codes can be exploited to achieve efficient, drift resistant decoding. Moreover, translation-stable codes which are inherently drift-invariant can be easily constructed based on the principles described.

It will of course be appreciated that many changes and modifications can be made to the particular embodiments detailed above. For example, other ways might be envisaged for relating read signals to the set of initial vectors to exploit the permutation property of the SPC-based codes for codeword detection. Also, while memory 2 uses PCM cells, the techniques described can be applied to other multilevel solid state memory cells, such as flash memory cells, where similar considerations apply. Many other changes and modifications can be made to the above embodiments without departing from the scope of the invention.

The invention claimed is:

1. A method for reading and writing data in q-level cells of solid-state memory, where q>2, the method comprising:
  encoding input data into codewords having N $q^{ary}$ symbols, wherein the symbols of each of the plurality of codewords satisfy a single-parity-check condition;
  writing each of the plurality of symbols in respective q-level cells of the solid state memory by setting the cell to a level dependent on the $q^{ary}$ value of the symbol;
  reading memory cells to obtain read signals corresponding to respective codewords; and detecting the codewords corresponding to respective read signals by relating the read signals to a predetermined set of N-symbol vectors of one of which each possible codeword is a permutation.

2. A method as claimed in claim 1 wherein the codewords are codewords of one of a length-N single-parity-check code or a coset thereof.

3. A method as claimed in claim 2 including:
mapping binary input data into $q^{ary}$ data symbols; and
encoding groups of (N-1) $q^{ary}$ data symbols into respective N-symbol codewords.

4. A method as claimed in claim 2, the method including encoding input data into codewords of a limited codeword set which excludes length-N $q^{ary}$-symbol words whose symbols satisfy said single-parity-check condition but which are contained in the set of all permutations of at least one N-symbol vector having a smaller orbit under permutation than vectors in said predetermined set.

5. A method as claimed in claim 1 wherein:
the symbols of each codeword each comprise a plurality of sub-symbols corresponding to respective code levels; and
in each codeword, the N sub-symbols of at least one code level comply with one of a length-N single-parity-check code or a coset thereof.

6. A method as claimed in claim 5 wherein:
the codeword symbols each comprise a most-significant sub-symbol and a least-significant sub-symbol; and
in each codeword, the N least-significant sub-symbols comply with one of a length-N single parity check code or a coset thereof.

7. A method as claimed in claim 6 wherein, in each codeword, the N most-significant sub-symbols also comply with one of a length-N single parity check code or a coset thereof.

8. A method as claimed in claim 5 including:
mapping binary input data into sub-symbols of said code levels; and
for any code level whose sub-symbols comply with a parity check code or coset thereof, encoding groups of (N-1) sub-symbols of that code level into the N sub-symbols of that level in respective codewords.

9. A method as claimed in claim 5, the method including encoding input data into codewords of a limited codeword set which excludes length-N $q^{ary}$-symbol words whose symbols satisfy said single-parity-check condition but which are contained in the set of all permutations of at least one N-symbol vector having a smaller orbit under permutation than vectors in said predetermined set.

10. A method as claimed in claim 1, wherein the codewords are codewords of a translation-stable code.

11. A method as claimed in claim 1 wherein each read signal comprises N signal components corresponding to respective symbols of a codeword, the method including detecting the codewords corresponding to respective read signals by:
ordering the components of each read signal according to signal level to produce an ordered read signal; and
relating the components of ordered read signals to symbols of said set of vectors.

12. A method as claimed in claim 11 including:
reading the memory cells storing a group of codewords to obtain read signals for the group;
averaging corresponding components of the ordered read signals for the group to produce an average read signal;
determining a reference signal level corresponding to each of the q levels of the memory cells in dependence on the average read signal and predefined probabilities of occurrence of each symbol value at each symbol position in a said codeword whose symbols are ordered according to symbol value; and
detecting the codeword corresponding to each read signal in dependence on the reference signal levels.

13. A method as claimed in claim 12 wherein said predetermined set comprises a plurality of vectors, the method including detecting the codeword corresponding to each read signal by:
producing a vector signal corresponding to each N-symbol vector by replacing each symbol of the vector by the reference signal level corresponding to the symbol value; and
identifying the vector of which each codeword in said group is a permutation by determining which vector signal is closest to the ordered read signal for that codeword.

14. A method as claimed in claim 13 including:
calculating statistical data for the distribution of the read signal component levels corresponding to each of the q levels of the memory cells from the ordered read signals and the vectors identified for the codewords corresponding thereto.

15. A method as claimed in claim 14 including detecting the codeword corresponding to each read signal by trellis decoding using said statistical data.

16. An apparatus for reading and writing data in q-level cells of solid-state memory, where q>2, the apparatus comprising:
an encoder for encoding input data into codewords having N $q^{ary}$ symbols, wherein the symbols of each of the plurality of codewords satisfy a single-parity-check condition;
a read/write controller for writing each of the plurality of symbols in respective q-level cells of the solid state memory by setting the cell to a level dependent on the $q^{ary}$ value of the symbol, and for reading memory cells to obtain read signals corresponding to respective codewords; and
a detector for detecting the codewords corresponding to respective read signals by relating the read signals to a predetermined set of N-symbol vectors of one of which each possible codeword is a permutation.

* * * * *